(12) United States Patent
Lee

(10) Patent No.: US 8,104,598 B2
(45) Date of Patent: Jan. 31, 2012

(54) FRICTION DEVICE FOR AUTOMATIC TRANSMISSION

(75) Inventor: Jaejoon Lee, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 421 days.

(21) Appl. No.: 12/323,455

(22) Filed: Nov. 25, 2008

(65) Prior Publication Data

US 2009/0283379 A1 Nov. 19, 2009

(30) Foreign Application Priority Data

May 14, 2008 (KR) .................. 10-2008-0044362

(51) Int. Cl.
*F16D 25/0638* (2006.01)
(52) U.S. Cl. .................. 192/85.42; 192/85.24
(58) Field of Classification Search ............... 192/85.39, 192/85.42, 85.32, 85.41
See application file for complete search history.

(56) References Cited

U.S. PATENT DOCUMENTS

| 6,468,177 B2 * | 10/2002 | Park .............................. 475/271 |
| 2004/0014552 A1 * | 1/2004 | Ikeda ........................... 475/275 |
| 2006/0016660 A1 * | 1/2006 | Portell et al. ............. 192/85 AA |

FOREIGN PATENT DOCUMENTS

| JP | 8-011700 | 1/1996 |
| JP | 10-244937 | 9/1998 |
| KR | 10-2003-0048757 | 6/2003 |

* cited by examiner

*Primary Examiner* — David D Le
*Assistant Examiner* — Jacob S Scott
(74) *Attorney, Agent, or Firm* — Morgan, Lewis & Bockius LLP

(57) ABSTRACT

A friction device for an automatic transmission according to the invention includes a retainer, a wave coil spring, a center support, a piston, and a plurality of plates. The retainer is disposed on the inner circumference of a transmission case. The wave coil spring is disposed on a seating portion of the retainer. The center support is disposed in the transmission case. The piston is disposed in a pressure chamber of the center support and provided with a return force by contacting with the wave coil spring. The plates are spline-connected with the inner circumference of the transmission case and pressed by the piston. Further, the retainer has a protruding portion to align the center axis of the wave coil spring with the center axis of the transmission case.

18 Claims, 6 Drawing Sheets

FRICTION DEVICE FOR AUTOMATIC TRANSMISSION

CROSS-REFERENCE TO RELATED APPLICATIONS

The present application claims priority to Korean Application Serial Number 10-2008-0044362, filed on May 14, 2008, the entire contents of which is incorporated herein for all purposes by this reference.

FIELD OF THE INVENTION

The present invention relates to a friction device for an automatic transmission, particularly, a friction device for an automatic transmission that makes it possible to easily align an elastic member, which provides a return force to a piston, with the center axis of the case of the transmission.

BACKGROUND OF THE INVENTION

In general, an automatic transmission includes a friction device, such as a clutch or a brake, which is connected with an input shaft, a planetary gear set, or each operation element of the planetary gear set in the case of the transmission. In this configuration, it needs to align the center axis of the friction device and the center axis of the input shaft with the center axis of the transmission case to secure the exact positions.

For example, according to an automatic transmission in the related art, as shown in FIG. 1 showing the configuration of main parts, an input shaft 3, a friction device 5, and a center support 7, etc. are disposed in a transmission case 1, in which input shaft 3 and friction device 5 are assembled such that the center axis are aligned with the center axis X of transmission case 1, and the assembly process is as follows.

Transmission case 1 has a large-diameter portion that is formed in a relatively large diameter at a side and connected with a torque converter and a small-diameter portion that is formed in a relatively small diameter at the other side opposite to the large-diameter portion and forms the rear end of the automatic transmission. Accordingly, a worker stands transmission case 1 such that the large-diameter portion is positioned upward while the small-diameter portion faces the floor and then sequentially assembles various parts including input shaft 3 inside the case.

However, when positioning center support 7 equipped with a piston in a pressure chamber to provide a fastening force to friction device 5 into transmission case 1 in the assembly direction (indicated by an arrow), the worker cannot see with naked eyes interference between piston 9 and a plate spring 11 that provides a return force to friction device 5, such that it is difficult to assemble friction device 5, thereby reducing the work efficiency. This is because, as shown in FIG. 2, plate spring 11 has elastic pieces 11a that protrude with inclination at regular intervals on the inner circumference and plate spring 11 should be assembled such that elastic pieces 11a are alternately positioned with pressing ends 9a that protrude at regular intervals on the front end of piston 9.

In detail, after plate spring 11 is positioned in transmission case 1, when piston 9 is assembled with center support 7 and then center support 7 is positioned in transmission case 1 in the assembly direction, the portion where pressing ends 9a of piston 9 and elastic pieces 11a of plate spring alternately connected is covered by center support 7. Therefore, the worker should fit the alternate connecting portion between pressing ends 9a and elastic pieces 11a while circumferentially rotating center support 7.

A snap ring is disposed on the inner circumference of transmission case 1 to firmly support a side of plate spring 11.

Accordingly, a new-typed elastic member without the alternate connecting structure of pressing ends 9a of piston 9 and elastic pieces 11a of plate spring 11 has been proposed, which is shown in FIG. 3.

That is, a snap ring 13 is disposed on the inner circumference of transmission case 1 in the assembly direction (indicated by an arrow), a side of a wave coil spring 15 is supported by snap ring 13 as shown in FIG. 3, and pressing ends 9a of piston 9 disposed in pressure chamber 7a of center support 7 is disposed through the insides of snap ring 13 and wave coil spring 15, which is a new type.

According to this structure, because there is no direct connecting portion between piston 9 and wave coil spring 15, it does not need to circumferential rotate center support 7 for assembly. However, unless the center axis of wave coil spring 15 placed on snap ring 13 is exactly aligned with center axis X of transmission case 1, assembly defect is generated by contact between pressing ends 9a of piston 9 and the inner circumference of wave coil spring 15. Accordingly, when it is wrong assembly, a portion of wave coil spring 15 is deformed by pressing ends 9a of piston and normal function may not be achieved.

Reference numeral '5a' that is shown in FIGS. 1 and 3 indicates a plurality of plates that is spline-connected with the inner circumference of transmission case 1, '5b' indicates discs that are alternately interposed between the plates, and '5c' indicates a hub that is spline-connected with the outer circumference of discs 5b.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to making it possible to easily align an elastic member, which is disposed to provide a return force to a piston of a friction device, with the center axis of the transmission case using characteristics in shape of a retainer.

A friction device for an automatic transmission according to the invention includes an elastomeric member disposed in a transmission case, a circumferential retainer disposed on the inner circumference of the transmission case and configured to retain the elastomeric member in the transmission case, a center support disposed in the transmission case adjacent the elastomeric member, a piston disposed in a pressure chamber formed in the center support and provided with a return force by contact with the elastomeric member, and a plurality of plates operationally-connected with the inner circumference of the transmission case and in contact with the piston. The retainer includes a protruding portion configured to substantially align the center axis of the elastomeric member with the center axis of the transmission case.

In various embodiments, the protruding portion extends from an outer circumference of a seating portion of the retainer in a thickness direction of the retainer. An outer portion of the protruding portion opposing the retainer may have an inclined slope. The outer diameter of the elastomeric member may be about the same as or smaller than the outer diameter of the retainer.

In various embodiments, the radius with respect to an interface between the seating surface and the inclined slope and the inner diameter of the elastomeric member is greater than an inner diameter of the retainer.

In various aspects of the invention, the transmission case includes a stepped portion formed along the inner circumference of the transmission case and configured to receive a lower portion of the retainer. A pressing end may be formed at one end of the piston is positioned inside a circumference of the retainer and a circumference of the elastomeric member.

The elastomeric member may be disposed between an outer circumference of the center support and the pressure end of the piston in a radial direction. In various embodiments, the plates are pressed by the pressing end of the piston.

The protruding portion may include a seating portion opposing the elastomeric member, the protruding portion extending at an angle from an outer circumference of the seating portion in a direction of a center axis of the retainer. The protruding portion faces the center axis of the retainer on the inner side thereof.

An inner diameter of the elastomeric member may be about equal to or greater than an inner diameter of the retainer.

Various aspects of the invention are directed to an automatic transmission including the friction device as described above. Various aspects of the invention are directed to a passenger vehicle comprising the friction device as described above. Various aspects of the invention are directed to a passenger vehicle comprising the automatic transmission as described above.

In various embodiments, the retainer further includes a seating portion adjacent the elastomeric member, wherein the protruding portion is configured to slidably-adjust a position of the elastomeric member on the seating portion.

The plurality of plates may be spline-connected with the inner circumference of the transmission case. The elastomeric member may be a wave coil spring.

In various embodiments, the center axis of the transmission case is substantially parallel with a center axis of an input shaft. The retainer may be ring-shaped.

According to the friction device for an automatic transmission of the invention, it is possible to easily align the axial center of the transmission case with the elastic member, which provides a return force to the piston of the friction device, using the downward slope of the spring retainer disposed in the transmission case, such that it does not need to circumferential rotate the center support and adjust the position to align the axial centers of the spring retainer and the elastic member with the axial center of the transmission case, in assembly of the automatic transmission. Therefore, it is possible to improving work efficiency.

Further, since the outer diameter of the elastic member is the same as the outer diameter of the downward slope and the inner diameter of the elastic member is not smaller than the inner diameter of the spring retainer, it is possible to removed a problem due to interfere between the piston, the elastic member, and the spring retainer when positioning the center support into the transmission case.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE PREFERRED EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
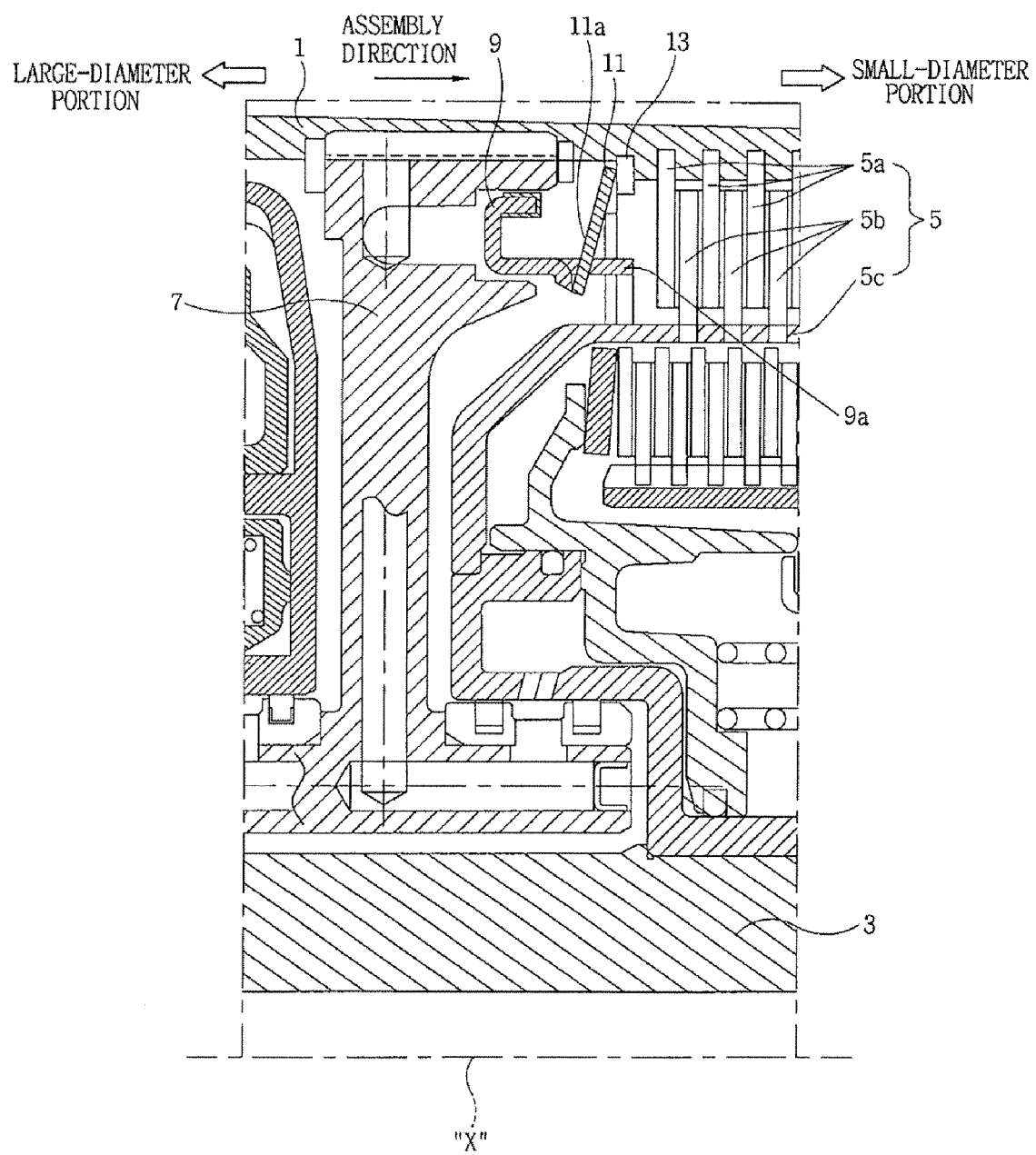
FIG. 1 is a partial view illustrating assembly of an automatic transmission in the related art.
Figure 2:
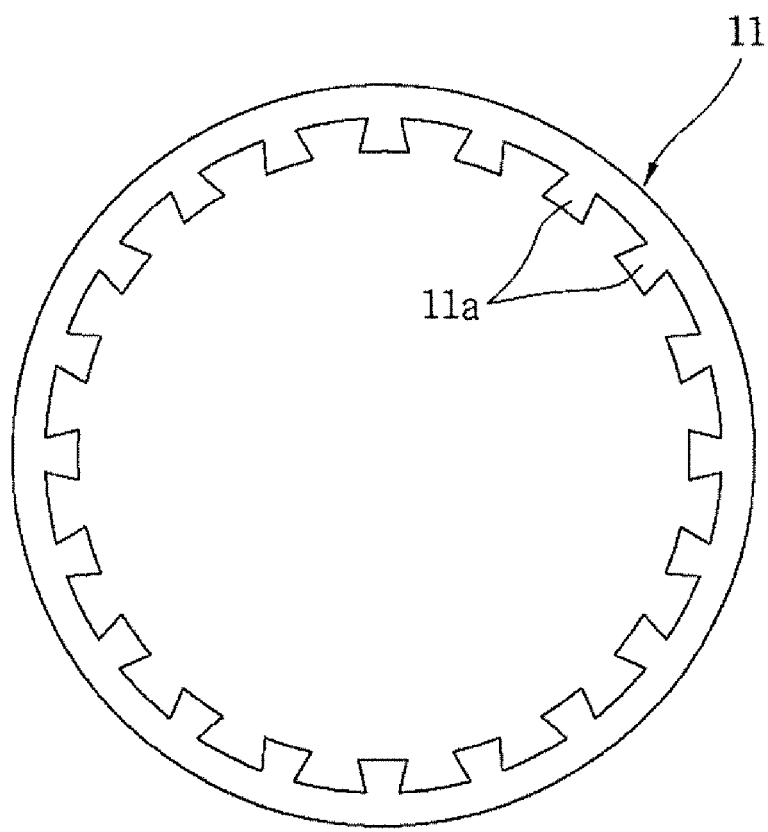
FIG. 2 is an enlarged view of a plate spring shown in FIG. 1.
Figure 3:
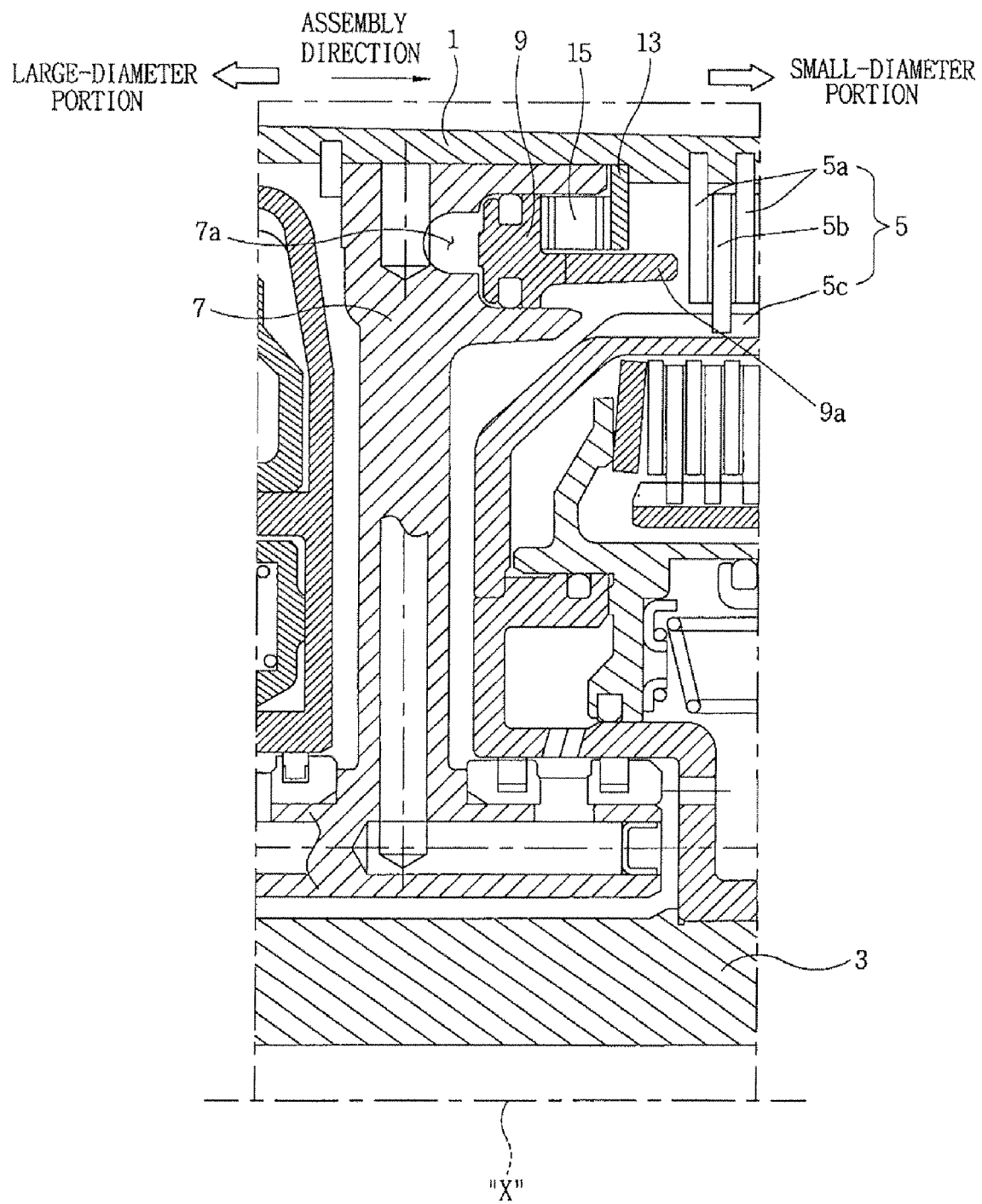
FIG. 3 is a partial cross-sectional view showing a conventional assembly of an automatic transmission.

An exemplary embodiment of the invention is described with reference to FIG. 3 showing a structure according to the related art and the same parts as the related art are represented by the same reference numerals.

Figure 5:
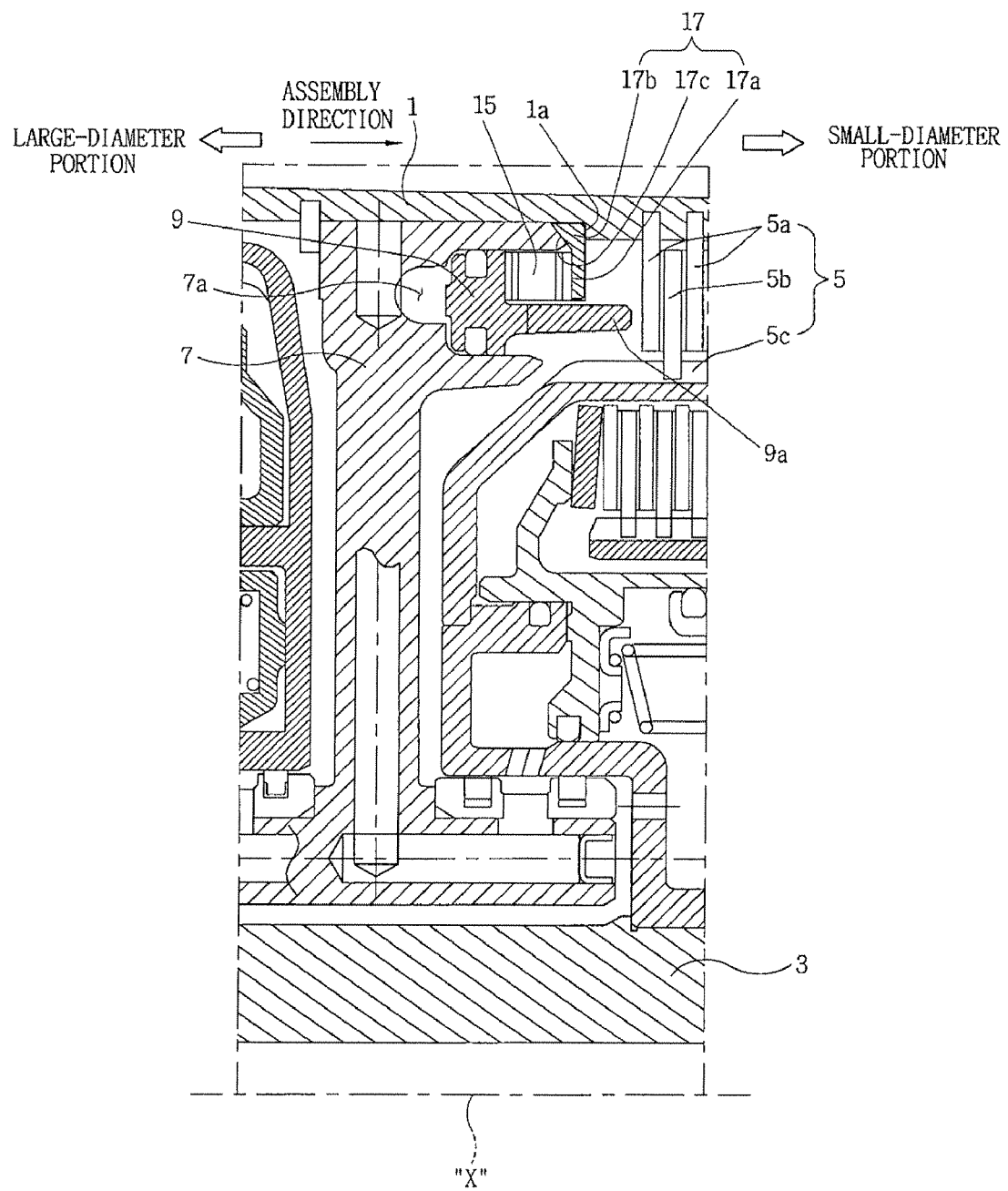
FIG. 5 is a partial cross-sectional view of an assembly of an exemplary automatic transmission in various aspects of the present invention.
Figure 6:
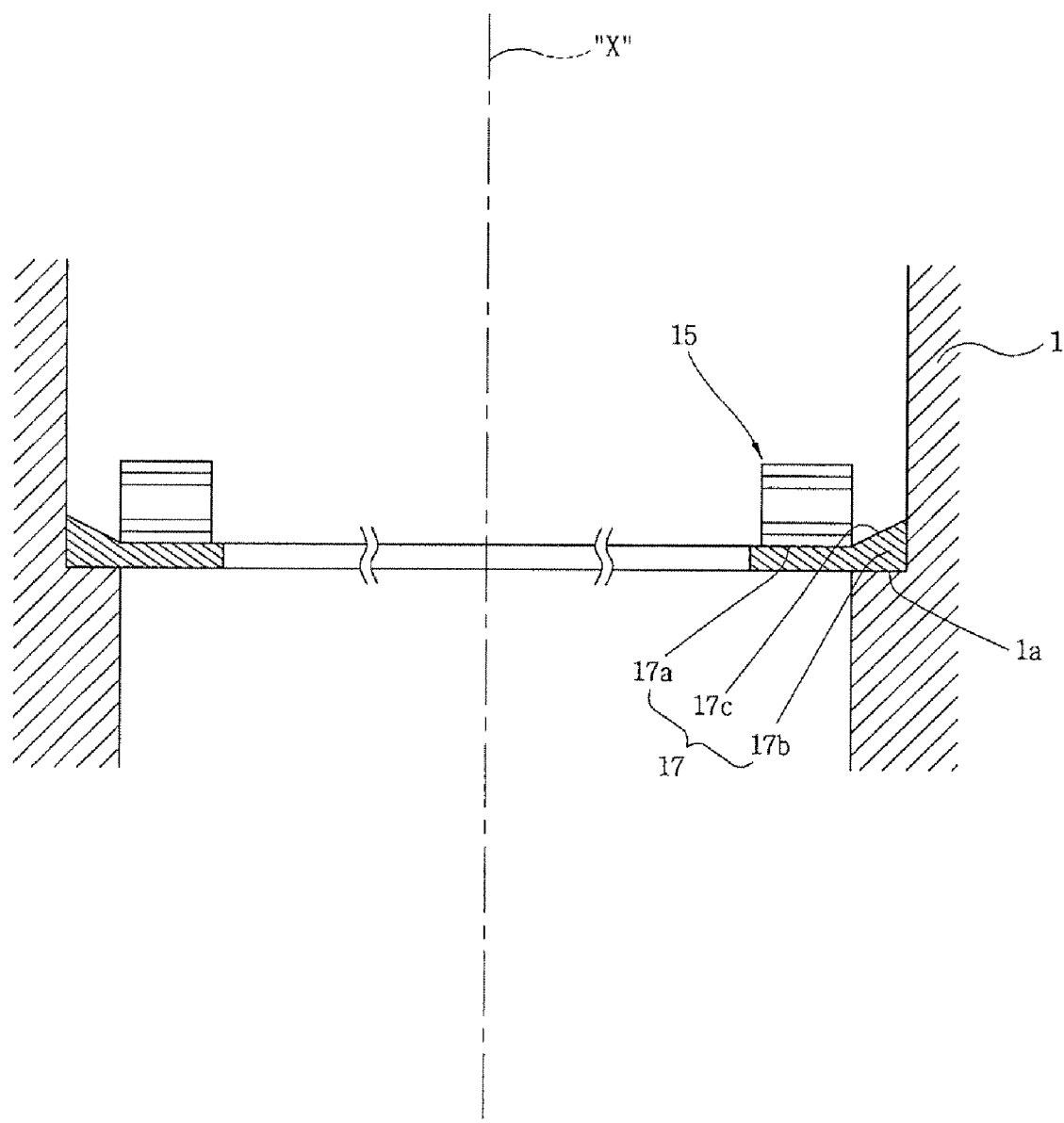
FIG. 6 is a schematic view illustrating arrangement of a retainer and an elastomeric member with respect to the center axis of the transmission case shown in FIG. 5.

According to an automatic transmission where the present invention is applied, as shown in FIGS. 5 and 6, an input shaft 3, a friction device 5, and a center support 7, and the like are disposed in a transmission case 1, in which input shaft 3, friction device 5, and center support 7 are assembled such that the center axis of each is aligned with the center axis X of transmission case 1.

Figure 4:
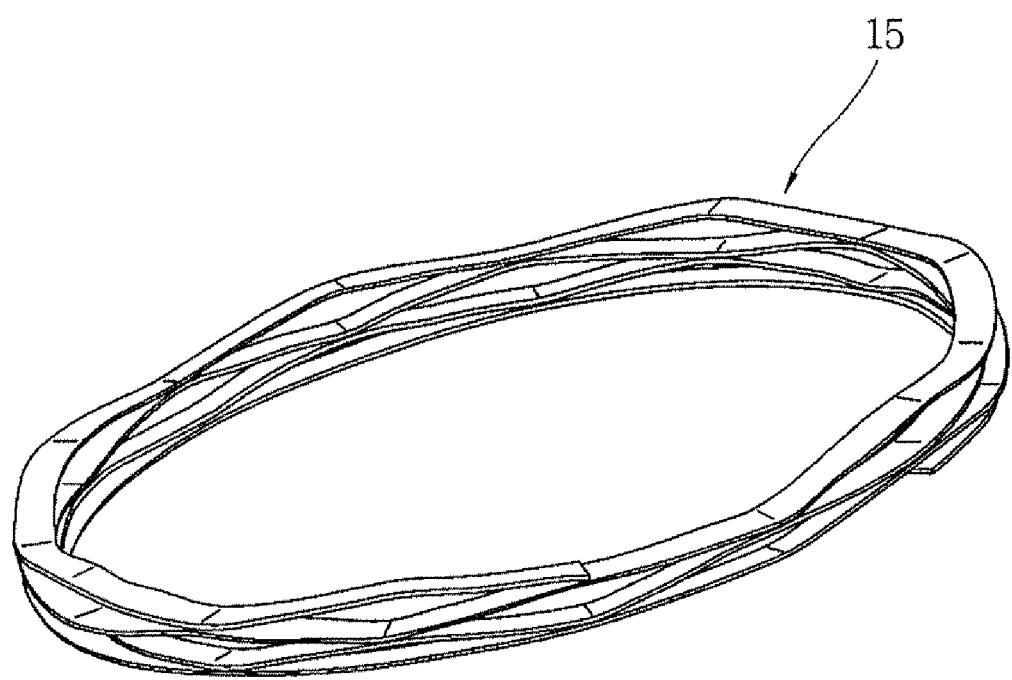
FIG. 4 is an enlarged view of an elastomeric member provided in an automatic transmission similar to that of FIG. 3.

In various embodiments, a ring-shaped, spring-like circumferential retainer 17 is placed on a stepped portion 1a formed along the inner circumference of transmission case 1 and a side of a ring-shaped elastomeric member is supported by a seating portion 17a of retainer 17. A wave coil spring (represented by '15' in detail in FIG. 4) is exemplified as the elastomeric member 15 hereafter; however, one will appreciate from the foregoing that other components and configurations may be provided in accordance with the present invention.

In the above configuration, center support 7 equipped with a piston 9 in a pressure chamber 7a is formed at a side of and disposed within transmission case 1 such that pressing ends 9a of piston 9 are positioned through and on the insides of the retainer 17 and wave coil spring 15 and the inner end of the piston 9 faces against the wave coil spring 15.

Further, retainer 17 has a protruding portion 17b to align the center axis X of transmission case 1 with the center axis of wave coil spring 15, in which protruding portion 17b extends from the outer side of seating portion 17a in the thickness direction of retainer 17.

Further, protruding portion 17b of retainer 17 has a downward or inclined slope 17c that is inclined downward toward the center axis of retainer 17, in which the center axis of retainer 17 is also aligned with center axis X of transmission case 1.

In addition, in various embodiments, the outer diameter of wave coil spring 15 is substantially the same as the radius with respect to the interface between seating surface 17a and downward slope 17c and the inner diameter of wave coils spring 15 is not smaller than the inner diameter of retainer 17, that is, the same or larger than the inner diameter of retainer 17. Further, the outer diameter of the wave coil spring may be substantially the same or less than the outer diameter of retainer 17.

Accordingly, when wave coil spring 15 is assembled after retainer 17 is placed on seating portion 17a of transmission case 1, the outer circumference of wave coil spring can be exactly placed on the interface between seating portion 17a and inclined slope 17c of retainer 17.

That is, when wave coil spring 15 is just placed on retainer 17, wave coil spring 15 is moved down by its own weight along inclined slope 17c of retainer 17. Accordingly, the center axis of wave coil spring 15 placed on retainer 17 is exactly aligned with center axis X of transmission case 1.

Subsequently, when center support 7 is positioned in transmission case 1, pressing ends 9a of piston 9 faces a plate 5a that is spline-connected with the inner circumference of transmission case 1, through the insides of retainer 17 and wave coil spring 15. Accordingly, pressing ends 9a of piston 9 can avoid interference with retainer 17 as well as wave coil spring 15.

In detail, after transmission case 1 is placed on a working table such that the large-diameter portion is positioned upward while the small-diameter portion is positioned downward, input shaft 3 and plates 5a, discs 5b, and hub 5c of friction device 5 are assembled in the assembly direction (indicated by an arrow). Subsequently, retainer 17 is placed on stepped portion 1a of transmission case 1 and then wave coil spring 15 is placed on seating portion 17a of retainer 17.

In the above work, wave coil spring 15 is placed on seating portion 17a by inclined slope 17c of retainer 17 such that the center axis of wave coil spring 15 substantially aligns with center axis X of transmission case 1. In this manner, the components are configured to promote aligning or are substantially self-aligning.

Thereafter, when center support 7 is inserted into transmission case 1, pressing ends 9a of piston 9 faces plates 5a without any interference, through the insides of wave coils spring 15 and retainer 17.

In the above work, it is not necessary to circumferentially rotate center support 7 and align the center axis of wave coil spring with center axis X of transmission case 1 as with conventional devices such that it is possible to reduce the working time and improve work efficiency.

According to the friction device for an automatic transmission of the present invention, it is possible to easily align the center axis of the transmission case with respective components, such as the elastomeric member. In turn, this provides a return force to the piston of the friction device, using the inclined slope of the retainer disposed in the transmission case, such that it is not necessary to circumferential rotate the center support and adjust the position to align the center axis of the retainer and the elastomeric member with the center axis of the transmission case during assembly of the automatic transmission. In this manner, it is possible to improve working efficiency and reduce errors during assembly.

Further, when the outer diameter of the elastomeric member is smaller than the outer diameter of the inclined slope and the inner diameter of the elastomeric member is not smaller than the inner diameter of the retainer, it is possible to reduce the risk of problems due to interfere between the piston, the elastomeric member, and the retainer when positioning the center support in the transmission case.

For convenience in explanation and accurate definition in the appended claims, the terms "up" or "upper", "down" or "lower", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A friction device for an automatic transmission, comprising:
    an elastomeric member disposed in a transmission case;
    a circumferential retainer disposed on an inner circumference of the transmission case and configured to retain the elastomeric member in the transmission case;
    a center support disposed in the transmission case adjacent the elastomeric member;
    a piston disposed in a pressure chamber formed in the center support and provided with a return force by contact with the elastomeric member; and
    a plurality of plates operationally-connected with the inner circumference of the transmission case and in contact with the piston;
    wherein the retainer includes a protruding portion configured to substantially align the center axis of the elastomeric member with the center axis of the transmission case;
    wherein an inner diameter of the elastomeric member is about equal to or greater than an inner diameter of the retainer; and
    wherein the protruding portion extends from an outer circumference of a seating portion of the retainer in a thickness direction of the retainer.

2. The friction device as defined in claim 1, wherein an outer portion of the protruding portion opposing the retainer has an inclined slope.

3. The friction device as defined in claim 2, wherein the outer diameter of the elastomeric member is about the same as or smaller than the outer diameter of the retainer.

4. The friction device as defined in claim 2, wherein a diameter with respect to an interface between the seating portion and the inclined slope and the inner diameter of the elastomeric member are greater than an inner diameter of the retainer.

5. The friction device as defined in claim 1, wherein the transmission case includes a stepped portion formed along the inner circumference of the transmission case and configured to receive a lower portion of the retainer.

6. The friction device as defined in claim 1, wherein a pressing end formed at one end of the piston is positioned inside a circumference of the retainer and a circumference of the elastomeric member.

7. The friction device as defined in claim 6, wherein the elastomeric member is disposed between an outer circumference of the center support and the pressing end of the piston in a radial direction.

8. The friction device as defined in claim 6, wherein the plates are pressed by the pressing end of the piston.

9. The friction device as defined in claim 1, wherein the seating portion opposes the elastomeric member, the protruding portion extending at an angle from an outer circumference of the seating portion in a direction of a center axis of the retainer.

10. The friction device as defined in claim 9, wherein the protruding portion faces the center axis of the retainer on the inner side thereof.

11. An automatic transmission comprising the friction device as defined in claim 1.

12. A passenger vehicle comprising the friction device as defined in claim 1.

13. A passenger vehicle comprising the automatic transmission as defined in claim 11.

14. The friction device as defined in claim 1, wherein the seating portion is adjacent the elastomeric member, wherein the protruding portion is configured to slidably-adjust a position of the elastomeric member on the seating portion.

15. The friction device as defined in claim 1, wherein the plurality of plates are spline-connected with the inner circumference of the transmission case.

16. The friction device as defined in claim 1, wherein the elastomeric member is a wave coil spring.

17. The friction device as defined in claim 1, wherein the center axis of the transmission case is substantially parallel with a center axis of an input shaft.

18. The friction device as defined in claim 1, wherein the retainer is ring-shaped.

* * * * *